US009321219B2

(12) United States Patent
Zahlen et al.

(10) Patent No.: US 9,321,219 B2
(45) Date of Patent: Apr. 26, 2016

(54) METHOD FOR ASSEMBLING ELEMENTS OF COMPOSITE MATERIAL FOR AIRCRAFTS, WITH STRESS RELAXATION IN THE ELEMENTS

(71) Applicants: AIRBUS OPERATIONS (SAS), Toulouse (FR); AIRBUS OPERATIONS GMBH, Hamburg (DE); AIRBUS OPERATIONS S.L., Getafe-Madrid (ES)

(72) Inventors: Pierre Zahlen, Stade (DE); Virginie Charbonnier, La Chevroliere (FR); Philippe Blot, Nantes (FR); Melania Perez-Sanchez, Madrid (ES)

(73) Assignees: Airbus Operations (S.A.S.), Toulouse (FR); Airbus Operations, Hamburg (DE); Airbus Operations S.L., Madrid (ES)

( * ) Notice: Subject to any disclaimer, the term of this patent is extended or adjusted under 35 U.S.C. 154(b) by 264 days.

(21) Appl. No.: 14/167,202

(22) Filed: Jan. 29, 2014

(65) Prior Publication Data
US 2014/0216635 A1    Aug. 7, 2014

(30) Foreign Application Priority Data

Jan. 30, 2013    (FR) ...................... 13 50800

(51) Int. Cl.
*B29C 65/56*    (2006.01)
*B29C 65/02*    (2006.01)
(Continued)

(52) U.S. Cl.
CPC ........... *B29C 70/342* (2013.01); *B29C 65/5057* (2013.01); *B29C 66/1122* (2013.01); *B29C 66/532* (2013.01); *B29C 66/721* (2013.01);
(Continued)

(58) Field of Classification Search
CPC ................ B29C 70/342; B29C 66/721; B29C 66/73754; B29C 65/02; B29C 65/4815; B29C 65/4835; B29C 65/5057; B29C 66/1122; B29C 66/81423; B29C 66/81463; B29C 66/81451
See application file for complete search history.

(56) References Cited

U.S. PATENT DOCUMENTS

| 2005/0140045 A1 | 6/2005 | Okamoto et al. |
| 2005/0183816 A1 | 8/2005 | Ilzhoefer et al. |
| 2010/0147460 A1 | 6/2010 | Lefebure |

FOREIGN PATENT DOCUMENTS

| DE | 3715409 A1 * | 12/1987 |
| DE | 103 60 743 | 7/2005 |

(Continued)

OTHER PUBLICATIONS

F.C. Campbell, "Manufacturing Processes for Advanced Composites, Chapter 12 Assembly: The Best Assembly is No Assembly Required" Jan. 1, 2004, pp. 435-464, 469.

(Continued)

*Primary Examiner* — Jeff Aftergut
(74) *Attorney, Agent, or Firm* — Nixon & Vanderhye P.C.

(57) ABSTRACT

The invention relates to a method of assembling composite material parts (10, 12). The method makes provision for:
  mounting (S6) the parts for assembly under stress on a stand (14), which parts have been partially polymerized;
  heating (S7) these parts so as to polymerize them completely, thereby enabling the stresses in the parts to be relaxed and enabling them to match the shape of the sand;
  cooling (S8) the parts; and
  assembling (S9) in conventional manner the parts as cooled in this way.

18 Claims, 3 Drawing Sheets

(51) Int. Cl.
  *B29C 70/34* (2006.01)
  *B29C 65/00* (2006.01)
  *B29C 65/50* (2006.01)
  *B29K 105/24* (2006.01)
  *B29L 31/30* (2006.01)
  *B29C 65/48* (2006.01)

(52) U.S. Cl.
  CPC ..... *B29C 66/73754* (2013.01); *B29C 66/73941* (2013.01); *B29C 66/8185* (2013.01); *B29C 66/81423* (2013.01); *B29C 66/81451* (2013.01); *B29C 66/81463* (2013.01); *B29C 65/02* (2013.01); *B29C 65/4815* (2013.01); *B29C 65/4835* (2013.01); *B29C 66/7212* (2013.01); *B29C 66/72141* (2013.01); *B29K 2105/243* (2013.01); *B29L 2031/3076* (2013.01); *B29L 2031/3082* (2013.01)

(56) References Cited

FOREIGN PATENT DOCUMENTS

| | | |
|---|---|---|
| EP | 1 547 753 | 6/2005 |
| WO | WO 2008/071657 | 6/2008 |
| WO | WO 2013/001458 | 1/2013 |

OTHER PUBLICATIONS

Search Report for FR 1350800 dated Oct. 10, 2013.

\* cited by examiner

METHOD FOR ASSEMBLING ELEMENTS OF COMPOSITE MATERIAL FOR AIRCRAFTS, WITH STRESS RELAXATION IN THE ELEMENTS

This application claims priority to FR Application No. 1350800 filed Jan. 30, 2013, the entire contents of which is hereby incorporated by reference.

The invention relates to a method of assembling together composite material parts, in particular aircraft parts.

It is known to assemble composite material parts together by a so-called "secondary bonding" method.

While performing such a method, the parts are polymerized separately. These parts in the polymerized state are then mounted on an assembly stand and an adhesive film, e.g. an epoxy resin film, is interposed between the parts to be assembled together.

The set of parts as mounted in this way on the stand is heated to a high temperature in order to bond said parts together.

The use of the above method gives rise to residual deformation in the polymerized parts during cooling since bonding is performed at high temperature (e.g. 180° C.) on parts that often have different coefficients of thermal expansion (e.g. in particular because they have fibers at orientations that differ from one part to another). This residual deformation gives rise to internal stresses in the parts and consequently to overall deformation in the assembly of the parts.

Another assembly technique consists in assembling polymerized parts together by riveting. In that technique, it is possible to observe clearances between the parts when they are positioned prior to riveting. Such gaps are due to geometrical departures of each part from its theoretical shape. This is associated with the method of fabricating composite material parts.

In view of the above, it would be useful to be able to assemble composite material parts with shape that is better controlled than in the prior art.

The invention thus provides a method of assembling composite material parts in a final assembly geometrical configuration, the method being characterized in that it comprises the following steps:
  mounting at least two partially polymerized composite material parts under stress on a "pre-assembly" stand, the partially polymerized parts being arranged relative to each other in an assembly general geometrical arrangement that is that of the final assembly, the mounting of said at least two parts under stress shaping the assembly of said at least two parts to an assembly geometrical configuration that is imposed by the shape of the pre-assembly stand while inducing internal stresses in said at least two parts;
  heating together the pre-assembly stand and said at least two partially polymerized parts mounted under stress so as to completely polymerize and pre-assemble said at least two parts in the assembly geometrical configuration that is imposed by the shape of the pre-assembly stand, the heating serving to relieve the internal stresses in said at least two parts;
  cooling said at least two pre-assembled polymerized parts, said at least two parts as cooled in this way being in the final assembly geometrical configuration; and
  mechanically assembling together said at least two pre-assembled and cooled polymerized parts in the final assembly geometrical configuration, either on said pre-assembly stand or on another stand.

The partially polymerized parts are of a shape that is close to the final shape they are to have in the final assembly, but not necessarily identical to said shape. That is why the parts of uncontrolled shapes are mounted under stress on the pre-assembly stand or template. The partially polymerized parts (which are more malleable than completely polymerized parts, but which are nevertheless stiff) are mounted more particularly on the stand so as to adopt the general arrangement the parts are to have relative to one another in the final assembly geometrical configuration. In this general arrangement, the parts have not yet been subjected to geometrical/dimensional adjustments that are to be achieved as a result of the following steps of the method. Nevertheless, mounting under stress serves to shape the assembly of said at least two parts to the shape of the stand and thereby induces internal stresses in the parts.

The step of heating (post-polymerization) serves to relieve the internal mechanical stresses within the parts for assembling together (these stresses are due mainly to the mounting under stress on the stand). This step also makes it possible to perform provisional assembly (prior to the final assembly step) of the parts without residual stresses and to shape them to match the shape of the stand. It is thus possible to control the shape of the parts and more generally to control the final assembly geometrical configuration of the parts by controlling the shape of the stand.

The steps of mounting under stress, of heating, and of cooling enable the parts to be pre-assembled with the final shape of the final assembly.

It should be observed that the final assembly step may for example be of conventional type (e.g. assembly by means of rivets or screws for assembling the parts together) and it may take place on the pre-assembly stand itself, or on some other stand in order to avoid monopolizing the pre-assembly stand, which is generally in great demand. The other stand used solely for final assembly is generally less sophisticated and suffices amply for performing the final assembly step.

According to a possible characteristic, the shape of the pre-assembly stand is designed as a function of the coefficient(s) of thermal expansion of the materials constituting said stand and the parts to be assembled, and as a function of the temperatures used for the heating and cooling steps so that the final assembly geometrical configuration is obtained at the end of the cooling step.

During the heating step, the parts are pre-assembled in the geometrical configuration they are to have in the final assembly if the parts are not subjected to any shrinkage during cooling. If the materials constituting the parts have a coefficient of thermal expansion that is likely to give rise to changes in dimensions during a change of temperature, the shape of the stand should take account of this coefficient, of the heating temperature(s), and of any variation in the dimensions of the stand between the initial and final temperatures. The final assembly geometrical configuration of the parts is thus obtained at the end of the cooling step.

According to a possible characteristic, the pre-assembly stand comprises a set of mechanical members that prestress said at least two parts in order to shape them to the assembly geometrical configuration.

According to a possible characteristic, the pre-assembly stand also has a set of mechanical members of position that is adjustable in order to ensure mechanical contact with said at least two parts in a desired position. By adjusting the positions of these members, the accuracy of the shape and/or the dimensions of the parts is adjusted. It is very useful to be able to adjust this accuracy when the parts need to be able to interface/co-operate in very accurate manner with other parts.

According to a possible characteristic, the step of assembling said at least two pre-assembled and cooled polymerized parts in the final assembly geometrical configuration is performed on the pre-assembly stand which is made of a material that does not deform at the temperatures used for the heating step.

The use of a stand made of such a material makes it possible, while designing the stand, to ignore any phenomenon of thermal expansion of the stand between ambient temperature and the temperature of the heating step. The same stand can thus be used for the complete polymerization step and for the final assembly step, thereby simplifying implementation of the method and achieving a saving in time.

According to a possible characteristic, prior to the cooling step, the method includes a step of pre-assembling said at least two parts involving pre-assembly means that are distinct from the pre-assembly stand.

According to a possible characteristic, the pre-assembly means are mechanical and are put into place between the step of assembling under stress and the heating step.

According to a possible characteristic, prior to the step of heating together the pre-assembly stand and said at least two partially polymerized parts, the pre-assembly step includes a step of depositing at least one thermosetting adhesive film (e.g. an epoxy film) between said at least two partially polymerized composite material parts that are to be pre-assembled.

The thermosetting adhesive film(s) interposed between the parts for assembling serve(s) to pre-assemble the parts during the heating step.

According to an alternative possible characteristic, prior to the step of heating together the pre-assembly stand and said at least two partially polymerized parts, the pre-assembly step includes a step of depositing at least one thermoplastic film on two facing faces of said at least two partially polymerized composite material parts that are to be pre-assembled. Said at least one thermoplastic adhesive film could also be positioned on each of the parts prior to their partial polymerization.

The thermoplastic film(s) interposed between the parts for assembling serve(s) to pre-assemble the parts during the heating step.

It should be observed that the presence of the adhesive film(s) also makes it possible to compensate for any differences in shape between the parts for assembling when the respective shapes of the parts do not correspond perfectly with each other.

This makes it possible to avoid damaging the parts during final assembly in the event of there being differences of shape between the parts.

According to a possible characteristic, prior to the step of mounting under stress, the method includes a step of heating said at least two composite material parts to a temperature lower than the polymerization temperature in order to obtain said at least two partially polymerized composite material parts.

The parts for assembling are thus partially polymerized separately from each other. If these parts are fabricated at the same time and in the same workshop, they may be partially polymerized together in the same autoclave, but they should be physically separate from each other.

According to a possible characteristic, the prior heating step causes sufficient partial polymerization for the parts partially polymerized in this way to have stiffness that enables them to be handled in order to be mounted on the stand.

The level of polymerization needs to be sufficient to enable the partially polymerized parts to be trimmed easily (i.e. cut and/or machined so that their outlines match the desired final shape), dimensionally inspected, and transported to the pre-assembly stand.

According to a possible characteristic, the level of polymerization obtained at the end of the prior heating step lies in the range 50% to 95%, depending on the composition of the composite material parts to be assembled, and preferably in the range 70% to 95% in order to ensure that the parts are sufficiently rigid.

Such a level of polymerization gives the parts sufficient stiffness to enable them to be subjected to the above-mentioned operations.

According to a possible characteristic, the temperatures used for the heating step and for the prior heating step lie in the range 130° C. to 180° C. The duration of the dwell in each step may lie in the range a few minutes to several hours, e.g. 4 h. These temperatures depend on the composition on the composite material parts and in particular on the resin used.

By way of example, the temperature of the prior heating step lies in the range 110° C. to 180° C. for thermosetting resins of the 180° C. class. This temperature and the duration are arranged to avoid completely polymerizing the part, thus giving it the possibility of relieving its internal stresses during final heating (post-polymerization).

According to a possible characteristic, the heating in the polymerization step takes place at a temperature lying in the range 130° C. to 180° C. (about 180° C. for the example resin given above).

According to a possible characteristic, during the cooling step, said at least two pre-assembled polymerized parts remain mounted on the pre-assembly stand.

According to a possible characteristic, the method applies to simultaneously assembling a plurality of pairs of composite material parts.

It is thus possible to process simultaneously a plurality of pairs of parts that are to be assembled together, i.e. to mount them under stress, and to cause the stresses to relieve in all of the parts, and to do so in simultaneous manner.

According to a possible characteristic, the composite material parts are aircraft parts.

According to a possible characteristic, the aircraft parts are a fuselage frame and skin.

Other characteristics and advantages appear from the following description given purely by way of non-limiting example and made with reference to the accompanying drawings, in which.

With reference to FIGS. 1 to 5, there follows a description of a method of assembling composite material parts in an implementation of the invention.

In this implementation, the parts for assembling are aircraft parts and more particularly they are a fuselage frame (a circumferential stiffener) and a fuselage skin (covering).

Figure 1:
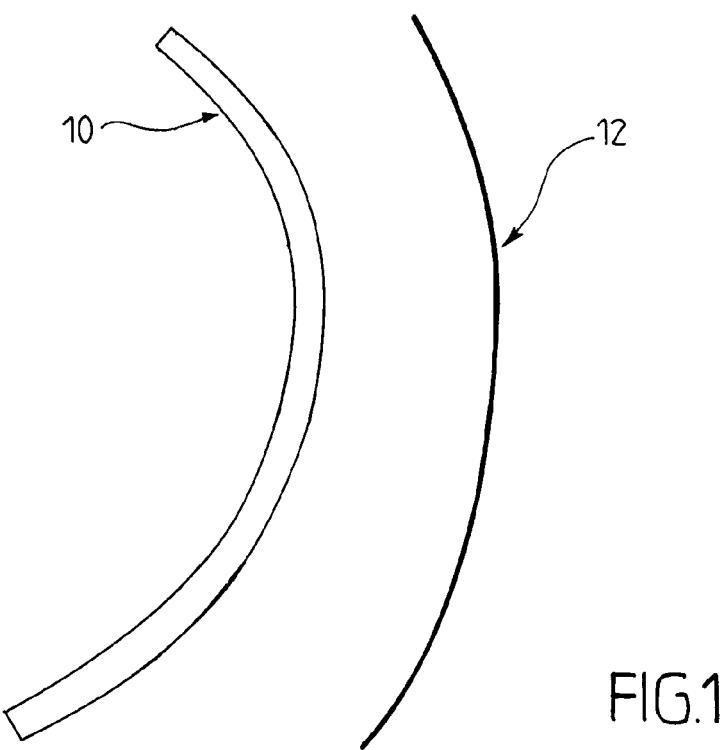
FIG. 1 is a general diagrammatic view of two aircraft parts that are to be assembled together.

FIG. 1 is a highly diagrammatic view of a portion of fuselage frame 10 and a portion of fuselage skin 12 while separate that are to form a fuselage panel once they have been assembled.

Each of these parts is made of composite material, for example they may be made of stacks of unidirectional sheets of carbon fibers or of woven fabric, and they may be pre-impregnated or dry.

Each part has a general shape or general geometrical configuration that corresponds to the shape needed for being assembled with the other part. The general shapes of these parts correspond to the shapes they are to have once the assembly of parts is installed in the aircraft.

In this implementation, the parts 10 and 12 are made of composite material having a coefficient of thermal expansion that is so small that it is assumed that a temperature variation applied to the parts gives rise to no change in the dimensions of the part. By way of example, such a composite material is a carbon fiber composite having a fiber volume fraction of 60%, together with epoxy resin.

Figure 2:
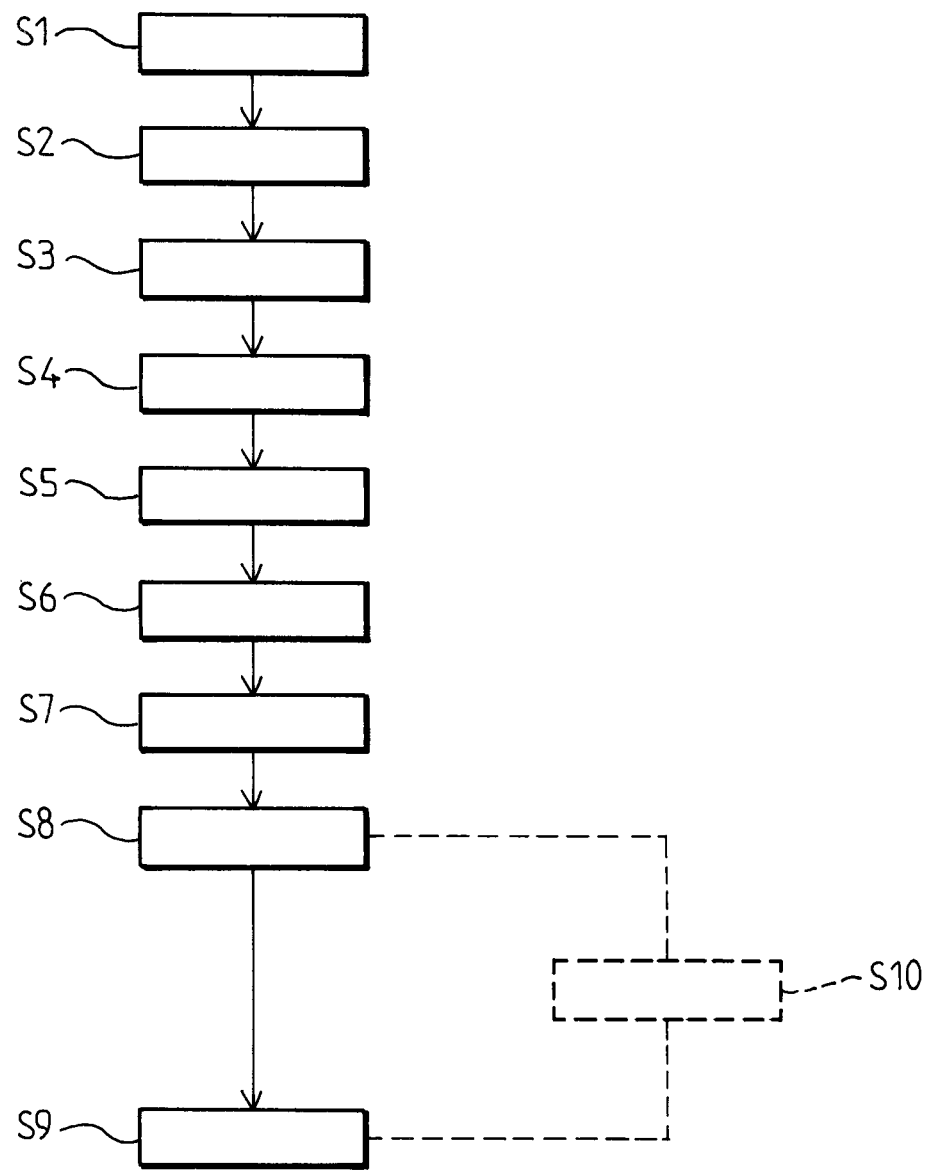
FIG. 2 is a flow chart of a method of assembling the FIG. 1 parts in an implementation of the invention.

The assembly method in the above-mentioned implementation is shown diagrammatically in FIG. 2 in the form of a flow chart reproducing the main steps of the method.

The method applies to parts of composite material structure that have already been fabricated in known manner. Nevertheless, the structure is not yet polymerized at the beginning of the method, i.e. the parts are uncured.

The first step S1 provides for prior heating of the parts 10, 12 while they are physically separate from each other. By way of example, it may be observed that these two parts can be heated simultaneously in the same stove or autoclave.

The prior heating takes place at a temperature lower than the polymerization temperature of the composite material in order to obtain partial polymerization of each of the parts.

The partial polymerization or the polymerization state of the composite material constituting each part needs to be sufficient for the partially polymerized part to present stiffness that enables it to be moved from one place to another, to be trimmed, and to be inspected. The term "inspection" relates to inspecting dimensions, and inspecting the quality of the composite material, specifically its porosity and whether cracks are present.

The resulting degree of polymerization, referred to as "partially cured" lies in the range 50% to 95%, and preferably in the range 70% to 95%, still more preferably in the range 80% to 95%, and it gives the parts sufficient stiffness for the intended operations.

The temperature of the prior heating generally lies in the ranges 110° C. to 180° C. for thermosetting resins of the 180° C. class.

For a resin that polymerizes at 180° C., the temperature for obtaining partial polymerization may for example be 160° C. and corresponds to the glass transition temperature of the resin.

The partially polymerized parts 10 and 12 need not necessarily have the final geometrical configuration or shape desired for being assembled together.

In addition, these parts present internal stresses that result from the partial polymerization step. These internal stresses give rise to residual deformation after unmolding.

In this respect, an additional step (not shown) of inspecting the shape of the parts may be performed, e.g. after extracting the parts from the stove, at the beginning of mass production.

As mentioned above and by way of example, the parts 10 and 12 may be trimmed in order to reduce the finishing operations needed after they have been assembled. This step is generally performed before the step of inspecting the parts.

Figure 3:
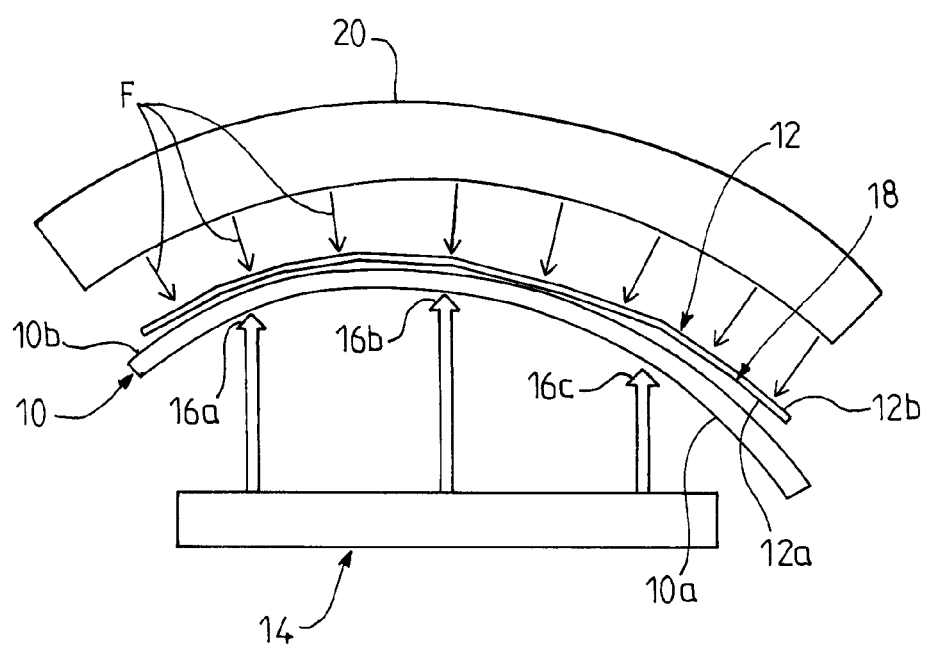
FIG. 3 is a general diagram of the FIG. 1 parts mounted under stress on a stand.

The following step S2 of the method provides for transporting the partially polymerized parts 10, 12 to a pre-assembly stand 14 shown in FIG. 3.

During the step S3, the part 10 is positioned on the stand 14 and rests on contact members, e.g. point members 16a, 16b, and 16c acting via positioning holes provided in the concave face 10a of the part that faces towards the stand.

An adhesive film 18, such as a film of thermosetting resin, e.g. an epoxy type film of the 180° C. class, is deposited on the partially polymerized part 10 (step S4), and more particularly on the opposite convex face 10b of the part. The part 12 is then positioned via its concave inner face 12a over the adhesive film 18 so as to imprison the film between the two parts (step S5).

The two parts 10 and 12 are thus arranged relative to each other in a general geometrical arrangement that corresponds to the arrangement they are to adopt in the final assembly.

The curved frame portion 10 is arranged against the inside face 12a of the curved fuselage skin portion 12 in the final assembly.

By way of example, the stand 14 is made of a material that does not deform at the temperatures used during the heating step S7, as described below with reference to FIG. 4.

By way of example, its material is Invar.

The shape of the stand therefore suffers no change in dimensions between the ambient temperature of steps S2 to S6 and the temperature of step S7.

The stand comprises a first step of mechanical means or members suitable for exerting forces/stresses on the parts for assembling together so as to confer an assembly geometrical shape on them. The parts are thus prestressed (internal stresses are created in the parts) in an assembly geometrical configuration that is imposed by the shape of the stand (and in particular the shape of its members).

The stand also has a second set of mechanical means or members that are adjustable in position. Adjusting their positions in contact with specific zones of the parts ensures that these zones have the desired accurate dimensions and/or shapes. This adjustment procures high accuracy for the part (in particular locally), which is found to be important when the zones in question of the parts need to co-operate mechanically with other parts of the aircraft.

This second set of mechanical members is also suitable for prestressing the parts.

As shown in FIG. 3, the stand 14 comprises firstly mechanical contact members 16a, 16b, 16c on which the set of parts 10, 12 comes to bear, and secondly mechanical members or means 20 (or even a single mechanical member or means that may be referred to as a tool) suitable for exerting forces/stresses on said set as represented by arrows F in order to prestress the parts 10, 12.

The set of parts 10, 12 is thus put under stress and shaped to match the shape of the stand, in particular of its contact members 16a-c and its means 20. By forcing the general geometrical arrangement of the set of parts to follow the determined shape imposed by the stand, mechanical stresses are induced inside the parts. If the parts were not longer subjected to the external stresses exerted by the stand, then their shape would depart from the shape of the stand.

The stress-applying members or means 20 are shown as being arranged on the side opposite from the contact members 16a-c, i.e. beside the convex outer face 12b of the part 12 in this example. Nevertheless, these means could be arranged beside the members 16a-c, or indeed on both sides, or even all around the set of parts 10, 12, depending on the natures of the means and the parts.

It should be observed that the contact members 16a-c also contribute to applying stress to the set of parts 10, 12 insofar as these members serve as bearing points for the set, and they thus take up the forces that are exerted on the parts that are being prestressed.

By way of example, the contact members 16a-c are of two types:
- a first type of member acting as spot bearing points (e.g. pegs); and
- a second type of member that are adjustable in position (e.g. adjustable abutments) for providing final accurate adjustment of the shape of the part, at least in certain local zones of the parts (such members may for example be micrometer screws). In particular, the final volume of the soleplate of the frame (C-shaped or Z-shaped) and the angle between the soleplate of the frame and its core are adjusted using the contact and adjustment members.

It should be observed that the number of contact and adjustment members and their positions are adapted as a function of the parts to be assembled (shape).

The forces for applying prestress are directed radially in this example, given the generally curved shape of the parts 10 and 12. By way of example, the means or members 20 comprise one or more actuators for the frame 10 and straps for the panel 12.

These strap means may for example be arranged on either side of the set of parts 10, 12.

The set of parts 10, 12 with the adhesive film 18 interposed between them is thus mounted under stress on the stand 14 between the spot contact members 16a-c and the means 20 (step S6).

The following step S7 of the method provides for placing the set of parts 10, 12 while mounted under stress on the stand 14 in a stove 22.

Figure 4:
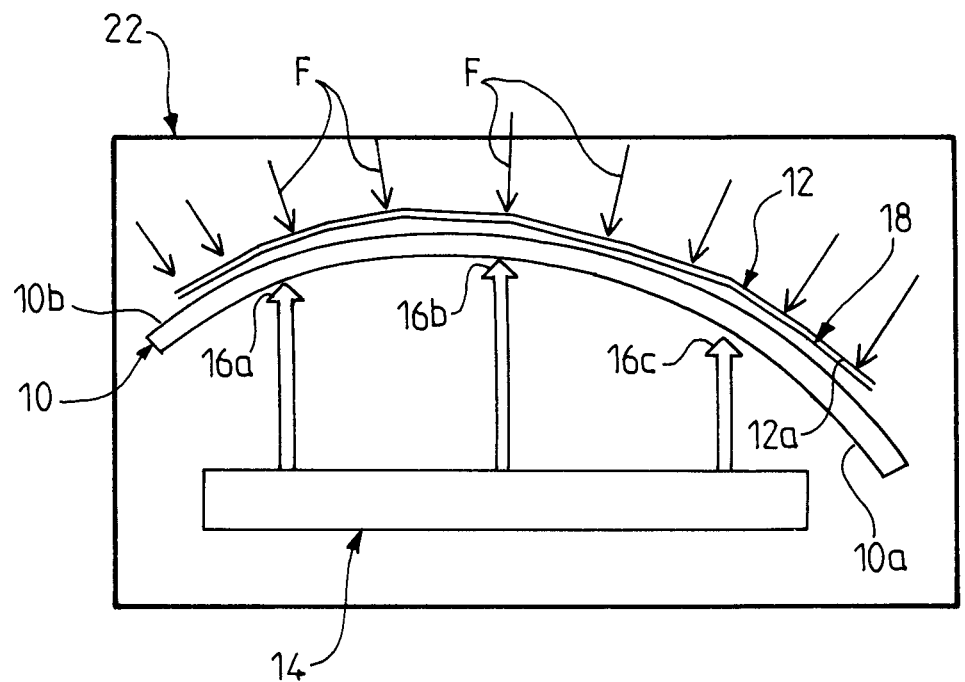
FIG. 4 is a general diagrammatic view of the parts and the stand of FIG. 3 inside a stove.

For simplification purposes, the means 20 are not shown in FIG. 4. Only the forces F are marked.

During this step, the set of parts 10, 12, the stand 14, and the means 20 are heated to a temperature higher than the prior heating temperature of step S1 (partial polymerization) in order to obtain complete polymerization of the parts 10 and 12 made of composite material.

By subjecting the parts 10, 12 to such a temperature, the internal mechanical stresses within the parts are relieved simultaneously, and the parts continue to match closely the determined shape of the pre-assembly stand 14. In the absence of internal stresses, the parts no longer need to be mounted under stress in order to match the shape of the stand.

On being heated, the adhesive film 18 softens and adheres to the facing faces 10b and 12a of the parts 10 and 12, thus performing its role of an adhesive for bonding the parts together.

The parts 10 and 12 are thus pre-assembled by means of the adhesive film.

The shape of the stand 14 is adjusted (prior to heating, by means of the adjustment and contact members 16a-c, by machining, ...) in very accurate manner. The final geometrical configuration or shape desired for the parts is imposed by the shape of the stand and it is obtained during heating (post-polymerization cycle), after the internal stresses in the parts have been relieved.

It should be observed that the adhesive film also has the function of filling in any interstices between the parts for assembly, and thus of compensating for any dimensional differences between the parts if their shapes do not match perfectly.

The heating temperature of step S7 is then higher than the partial polymerization temperature of the parts in step S1.

By way of example, the heating temperature of S7 is about 180° C. (polymerization temperature) for the resin that polymerize partially in step S1 at a prior heating temperature of 160° C.

The step S7 gives the parts their (desired) optimized mechanical properties in terms of strength and stiffness.

The following step S8 provides for extracting the pre-assembled parts and the stand 14 from the stove 22 and cooling them to ambient temperature.

The means 20 are withdrawn and the parts remain supported on the stand 14 during the cooling step.

Given the materials used (no differential thermal shrinkage), the assembly geometrical shape imposed on the parts by the stand (final assembly geometrical configuration) remains the same at the end of cooling.

It should be observed that the above-described steps lead to the part being pre-assembled with the final assembly shape (final assembly geometrical configuration).

Figure 5:
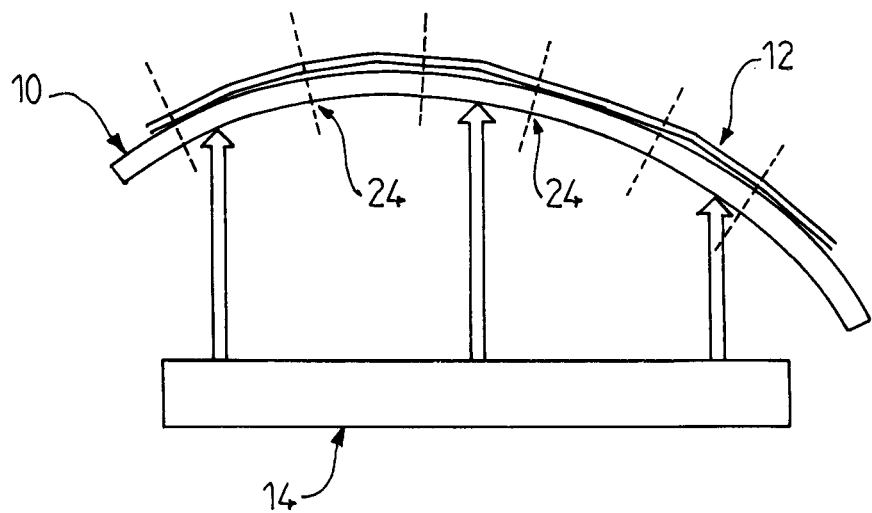
FIG. 5 is a general diagrammatic view showing the conventional last assembly step for the parts of FIG. 4.

During the following step S9, the pre-assembled parts 10, 12 that no longer have internal stresses are finally assembled together mechanically by conventional assembly means. Thus, step S9 provides, for example, for installing rivets 24 to finally assemble the two parts 10, 12 securely together (FIG. 5).

A conventional assembly step may be implemented because the parts have already been pre-assembled.

A first variant implementation of the assembly method is shown in dashed lines in FIG. 2.

In this variant, at the end of the cooling step S8, the set of pre-assembled parts 10, 12 is removed from the stand 14 (unmolding) in order to release the stand and allow it to be used for assembling together other parts made of composite material.

The set of parts is then placed on another stand that is of simpler design and more lightweight (step S10).

The final step of assembling the parts (step S9) is thus performed on the other stand.

Before describing the following variants, a general formula is given for defining the variation in the shape of the stand as a function of temperature. Such a formula is written as follows:

$$Sstand(20) = Sstand(180)(1 - Lstand(180-20))$$

with:

$$Sstand(180) = Scomp(180) = Scomp(20)(1 + Lcomp*(180-20))$$

where:
Sstand(20) is the shape of the stand at 20° C.;
Sstand(180) is the shape of the stand at 180° C.;
Scomp(20) is the shape of the composite set at 20° C.;
Scomp(180) is the shape of the composite set at 180° C.;
Lstand is the coefficient of thermal expansion of the stand; and
Lcomp is the coefficient of thermal expansion of the composite material.

Scomp(20) constitutes the base data that serves to define the shape Sstand(20) and thus to design the stand in a manner that matches the composite material parts for assembling together.

When the stand is made of a material that does not deform at the temperatures used (e.g. Invar), Lstand=0, thus giving Sstand(20)=Sstand(180) in the general formula given above.

With a composite material of the carbon epoxy type, Lcomp=0, giving Sstand(180)=Scomp(180)=Scomp(20).

In a second variant implementation, the composite material parts have a coefficient of thermal expansion that can give rise to dimensional variation in the parts between the heating temperature of step S7 and ambient temperature.

The shape of the pre-assembly stand 14 is thus designed (after calculation) so that on returning to ambient temperature, the pre-assembled parts 10 and 12 have the final assembly geometrical configuration in spite of the differential thermal shrinkage of the parts.

In a third variant implementation, the material from which the pre-assembly stand is made (e.g. steel) deforms under the effect of temperature variation and in particular of variation between ambient temperature and the temperature of the step S7. The parts 10 and 12 however do not deform.

The shape of the stand is thus designed (after calculation) at ambient temperature so that at the temperature of the step S7 and making allowance for the phenomenon of thermal expansion, the shape of the stand is the shape that is desired for the parts (final assembly geometrical configuration).

In a fourth variant implementation, the pre-assembly stand and the parts all expand thermally between ambient temperature and the temperature of the step S7.

The shape of the stand is thus that envisaged in the third implementation while also taking account of the coefficient of thermal expansion of the composite material of the parts.

It should be observed that in the event of there being a phenomenon of differential thermal expansion (in any of the variants) certain micrometer adjustments are needed on the stand in order to take this phenomenon into account.

In a fifth implementation, the adhesive film 18 is replaced by a thermoplastic film (thermoplastic resin) deposited between the face 10b of the part 10 and the face 12a of the part 12 before the final polymerization step. The thermoplastic film has a melting temperature that is equal to the polymerization temperature of step S7 or lower than said temperature.

In a sixth implementation, the adhesive film 18 is a thermoplastic film that is deposited on the faces 10b and 12a of the parts at the time of partial polymerization (step S1). The thermoplastic material can be remelted and is therefore suitable for being subjected to a plurality of thermal cycles without deteriorating. Thus, step S4 of the FIG. 2 method is omitted, thus serving to save time while the stand is being used, thereby tying up the stand for a shorter length of time.

In a seventh variant implementation, the parts for assembling together are mounted under stress on the stand and pre-assembled with each other by mechanical fastener or pre-assembly means such as rivets, screws, . . . . These means are not necessarily removed after heating and cooling, thus saving time. This variant is an alternative to interposing a film between the parts.

In an eighth variant implementation (not shown), the parts for assembling together may for example be stringers (longitudinal stiffeners) and a fuselage skin.

Other aircraft parts that are not shown herein may be assembled in accordance with the above-described assembly method.

The invention claimed is:

1. A method of assembling composite material parts (10, 12) in a final assembly geometrical configuration, the method being characterized in that it comprises the following steps:

mounting at least two partially polymerized composite material parts (10, 12) under stress (S6) on a "pre-assembly" stand (14), the partially polymerized parts being arranged relative to each other in an assembly general geometrical arrangement that is that of the final assembly, the mounting of said at least two parts under stress shaping the assembly of said at least two parts to an assembly geometrical configuration that is imposed by the shape of the pre-assembly stand while inducing internal stresses in said at least two parts;

heating (S7) together the pre-assembly stand (14) and said at least two partially polymerized parts (10, 12) mounted under stress so as to completely polymerize and pre-assemble said at least two parts in the assembly geometrical configuration that is imposed by the shape of the pre-assembly stand, the heating serving to relieve the internal stresses in said at least two parts;

cooling (S8) said at least two pre-assembled polymerized parts, said at least two parts as cooled in this way being in the final assembly geometrical configuration; and mechanically assembling (S9) together said at least two pre-assembled and cooled polymerized parts in the final assembly geometrical configuration.

2. A method according to claim 1, characterized in that the shape of the pre-assembly stand (14) is designed as a function of the coefficient(s) of thermal expansion of the materials constituting said stand and said at least two parts to be assembled together (10, 12), and as a function of the temperatures used for the heating and cooling steps so that the final assembly geometrical configuration is obtained at the end of the cooling step.

3. A method according to claim 1, characterized in that the pre-assembly stand comprises a set of mechanical members that prestress said at least two parts in order to shape them to the assembly geometrical configuration.

4. A method according to claim 3, characterized in that the pre-assembly stand also has a set of mechanical members of position that is adjustable in order to ensure mechanical contact with said at least two parts in a desired position.

5. A method according to claim 1, characterized in that the step (S9) of assembling said at least two pre-assembled and cooled polymerized parts in the final assembly geometrical configuration is performed on the pre-assembly stand, which is made of a material that does not deform at the temperatures used for the heating step.

6. A method according to claim 1, characterized in that, prior to the cooling step, the method includes a step of pre-assembling said at least two parts involving pre-assembly means that are distinct from the pre-assembly stand.

7. A method according to claim 6, characterized in that the pre-assembly means are mechanical and are put into place between the step of assembling under stress and the heating step.

8. A method according to claim 6, characterized in that, prior to the step of heating together the pre-assembly stand and said at least two partially polymerized parts, the pre-assembly step includes a step (S4) of depositing at least one thermosetting adhesive film (18) between said at least two partially polymerized composite material parts (10, 12) that are to be pre-assembled.

9. A method according to claim 6, characterized in that, prior to the step of heating together the pre-assembly stand and said at least two partially polymerized parts, the pre-assembly step includes a step (S4) of depositing at least one thermoplastic film on two facing faces of said at least two partially polymerized composite material parts that are to be pre-assembled.

10. A method according to claim 1, characterized in that it includes, prior to the step of assembly under stress, a step (S1) of heating said at least two composite material parts to a temperature lower than the polymerization temperature in order to obtain said at least two partially polymerized composite material parts.

11. A method according to claim 10, characterized in that the prior heating step causes sufficient partial polymerization for the parts partially polymerized in this way to have stiffness that enables them to be mounted on the stand.

12. A method according to claim 11, characterized in that the level of partial polymerization is sufficient for said at least two partially polymerized parts to be capable of being cut and/or machined so that their outline matches the desired final shape.

13. A method according to claim 10, characterized in that the polymerization level obtained at the end of the prior heating step lies in the range 50% to 95%, preferably in the range 70% to 95%.

14. A method according to claim 10, characterized in that the temperatures used for the heating step and for the prior heating step lie in the range 110° C. to 180° C.

15. A method according to claim 1, characterized in that during the cooling step, said at least two pre-assembled polymerized parts remain mounted on the pre-assembly stand.

16. A method according to claim 1, characterized in that it is applied to simultaneously assembling a plurality of pairs of composite material parts.

17. A method according to claim 1, characterized in that the composite material parts are aircraft parts.

18. A method according to claim 17, characterized in that the aircraft parts are a fuselage frame and skin.

* * * * *